(12) United States Patent  
Matsue et al.

(10) Patent No.: US 8,714,840 B2  
(45) Date of Patent: May 6, 2014

(54) OPTICAL MODULE AND CAGE

(75) Inventors: Hiroo Matsue, Kanagawa (JP); Akira Kuwahara, Kanagawa (JP); Hideki Sato, Kanagawa (JP); Hiroyoshi Isii, Kanagawa (JP); Fumihide Maeda, Odawara (JP)

(73) Assignee: Oclaro Japan, Inc., Kanagawa (JP)

( * ) Notice: Subject to any disclaimer, the term of this patent is extended or adjusted under 35 U.S.C. 154(b) by 42 days.

(21) Appl. No.: 13/610,022

(22) Filed: Sep. 11, 2012

(65) Prior Publication Data

US 2013/0077920 A1    Mar. 28, 2013

(30) Foreign Application Priority Data

Sep. 22, 2011 (JP) .................. 2011-207571

(51) Int. Cl.
*G02B 6/36* (2006.01)
*G02B 6/00* (2006.01)
*H04B 10/00* (2013.01)
*G02B 6/42* (2006.01)
*H04B 10/40* (2013.01)

(52) U.S. Cl.
CPC ............ *G02B 6/4292* (2013.01); *G02B 6/4246* (2013.01); *G02B 6/4201* (2013.01); *H04B 10/40* (2013.01)
USPC .............. 385/92; 385/139; 385/134; 398/135; 398/139

(58) Field of Classification Search
CPC ...... G02B 6/4292; G02B 6/4246; G02B 6/42; G02B 6/43; G02B 6/4201; G02B 6/3897; H04B 10/40
USPC .............. 385/88–92, 134, 139; 398/135–139, 398/182, 202; 439/577
See application file for complete search history.

(56) References Cited

U.S. PATENT DOCUMENTS 7,290,945 B2 * 11/2007 Ahrens et al. .................. 385/92
7,928,324 B2    4/2011 Moore

* cited by examiner

*Primary Examiner* — Uyen Chau N Le
*Assistant Examiner* — Michael Mooney
(74) *Attorney, Agent, or Firm* — Mattingly & Malur, PC (57) ABSTRACT

An optical module includes an electromagnetic wave absorption member. The electric connection member includes a floating portion which is in a floating state spaced apart from the housing and at a position away from a mounting portion by which the electric connection member is mounted on the housing in the direction opposite to the direction that the optical module is inserted into a cage. At least a portion of the electromagnetic wave absorption member is arranged between the housing and the floating portion. The floating portion is brought into contact with an inner side of the cage so as to establish the electrical connection with the inner side of the cage when the housing is inserted into the cage.

12 Claims, 4 Drawing Sheets

OPTICAL MODULE AND CAGE

CROSS-REFERENCE TO RELATED APPLICATION

The present application claims priority from Japanese application JP2011-207571 filed on Sep. 22, 2011, the contents of which are hereby incorporated by reference into this application.

BACKGROUND OF THE INVENTION

1. Field of the Invention

The present invention relates to an optical module and a communication-apparatus-use cage.

2. Description of the Related Art

An optical module has been popularly used for communication between apparatuses or between stations, and a plurality of optical modules are used in the inside of one apparatus depending on a case. In the use of the optical module, there may be a case where an amount of electromagnetic interference (EMI) generated by the module causes a problem. An amount of electromagnetic interference to a digital electronic apparatus is regulated by an organization such as Federal Communications Commission (FCC) in the United States of America, and is regulated by an organization such as International Special Committee on Radio Interference (CISPR) in Europe. In the optical module, there may be a case where a plurality of optical modules are used in one apparatus and hence, to regulate an amount of radiation of EMI within a limited value, it is necessary to suppress the EMI radiation from the optical module to a minimum value.

To reduce an amount of radiation of EMI from an optical module, as a conventional method which overcomes this drawback, there has been known a method where a metal collar provided with spring fingers is arranged around the optical module. Alternatively, there has been known a method where a metal color provided with spring fingers is arranged on an inner side of a cage which houses an optical module therein. In both structures, the optical module and a cage into which the optical module is inserted are electrically connected with each other by the metal collar. Particularly, in the U.S. Pat. No. 7,928,324 specification, there is disclosed a method where a space between an optical module and a cage is hermetically sealed by a metal collar, and a space between the metal collar and the optical module is embedded with a conductive gasket so that the electrical connection among the cage, the metal collar and the optical module is strengthened whereby an amount of radiation of EMI is reduced.

However, it is difficult in an actual practice to hermetically seal the space between the optical module and the cage by the metal collar or the conductive gasket and hence, there has been a case where an amount of radiation of EMI cannot be sufficiently reduced by the metal collar or the conductive gasket.

SUMMARY OF THE INVENTION

It is an object of the present invention to sufficiently reduce the radiation of electromagnetic interference generated from an optical module.

(1) According to one aspect of the present invention, there is provided an optical module pluggable by insertion into a cage of a communication apparatus, the optical module including: a photoelectric device which converts one of light energy and electric energy into the other; a housing which houses the photoelectric device therein; an electric connection member which is provided to an outer side of the housing in a projecting manner for electrical connection with the housing; and an electromagnetic wave absorption member, wherein the electric connection member includes a mounting portion which is electrically connected to the housing, and a floating portion in a floating state spaced apart from the housing, at least a portion of the electromagnetic wave absorption member is arranged between the housing and the floating portion, and the floating portion is brought into contact with an inner side of the cage when the housing is inserted into the cage such that at least a portion of the floating portion is electrically connected to the inner side of the cage. According to the present invention, although a space formed between the housing and the cage is closed by the electric connection member, leakage of electromagnetic waves cannot be completely prevented. Accordingly, by providing the electromagnetic wave absorption member to the optical module, the electromagnetic waves to the outside can be absorbed. As least a portion of the electromagnetic wave absorption member is arranged between the housing and the floating portion and hence, the electromagnetic waves can be efficiently absorbed.

(2) The optical module having the above-mentioned constitution (1) may be also characterized in that the electric connection member is constituted of a plurality of finger-shaped lugs which are arranged adjacent to each other with a gap therebetween, each finger-shaped lug includes the mounting portion by which the finger-shaped lug is mounted on the housing and the floating portion, and the electric connection member is mounted on the housing such that the electric connection member is arranged in the vicinity of an opening portion of the cage when the optical module is inserted into the cage.

(3) The optical module having the above-mentioned constitution (1) or (2) may be also characterized in that the electromagnetic wave absorption member is provided avoiding a state where the electromagnetic wave absorption member faces in an opposed manner a portion of the floating portion of the electric connection member adjacent to the mounting portion by which the electric connection member is mounted on the housing.

(4) The optical module having any one of the above-mentioned constitutions (1) to (3) may be also characterized in that the electromagnetic wave absorption member has a sheet shape, and is adhered to a first oppposedly facing surface of the floating portion of the electric connection member which faces the housing in an opposed manner and/or a second opposedly facing surface of the housing which faces the floating portion in an opposed manner.

(5) The optical module having any one of the above-mentioned constitutions (1) to (4) may be also characterized in that the electric connection member is provided over all sides of an outer surface of the housing in the direction that the electric connection member surrounds an axis which extends in the direction that the housing is inserted into the cage.

(6) The optical module having the above-mentioned constitution (5) may be also characterized in that the electromagnetic wave absorption member is provided over all sides of the outer surface of the housing without any cuts in the direction that the electromagnetic wave absorption member surrounds the axis.

(7) According to another aspect of the present invention, there is provided a communication-apparatus-use cage into which an optical module is inserted for plug connection, the communication-apparatus-use cage including: a hollow body having an opening; an electric connection member which is provided to an inner side of the body in a projecting manner;

and an electromagnetic wave absorption member, wherein the electric connection member includes a mounting portion which is electrically connected to the body, and a floating portion in a floating state spaced apart from the body, at least a portion of the electromagnetic wave absorption member is arranged between the body and the floating portion, and the floating portion is brought into contact with an outer side of the optical module when the optical module is inserted into the body such that at least a portion of the floating portion is electrically connected to the outer side of the optical module. According to the present invention, although a space formed between the optical module and the body is closed by the electric connection member, leakage of electromagnetic waves cannot be completely prevented. Accordingly, by providing the electromagnetic wave absorption member to the communication-apparatus-use cage, the electromagnetic waves to the outside can be absorbed. As least a portion of the electromagnetic wave absorption member is arranged between the body and the floating portion and hence, the electromagnetic waves can be efficiently absorbed.

(8) The communication-apparatus-use cage having the above-mentioned constitution (7) may be also characterized in that the electric connection member is constituted of a plurality of finger-shaped lugs which are arranged adjacent to each other with a gap therebetween, each finger-shaped lug includes the mounting portion by which the finger-shaped lug is mounted on the body and the floating portion, and the electric connection member is arranged in the vicinity of an opening portion of the body.

(9) The communication-apparatus-use cage having the above-mentioned constitution (7) or (8) may be also characterized in that the electromagnetic wave absorption member is provided avoiding a state where the electromagnetic wave absorption member faces in an opposed manner a portion of the floating portion of the electric connection member adjacent to the mounting portion by which the electric connection member is mounted on the body.

(10) The communication-apparatus-use cage having any one of the above-mentioned constitutions (7) to (9) may be also characterized in that the electromagnetic wave absorption member has a sheet shape, and is adhered to a first opposedly facing surface of the floating portion of the electric connection member which faces the body in an opposed manner and/or a second opposedly facing surface of the body which faces the floating portion in an opposed manner.

(11) The communication-apparatus-use cage having any one of the above-mentioned constitutions (7) to (10) may be also characterized in that the electric connection member is provided over all sides of an inner surface of the body in the direction that the electric connection member surrounds an axis which extends in the insertion direction of the optical module into the body.

(12) The communication-apparatus-use cage having the above-mentioned constitution (11) may be also characterized in that the electromagnetic wave absorption member is provided over all sides of the inner surface of the body without any cuts in the direction that the electromagnetic wave absorption member surrounds the axis.

DETAILED DESCRIPTION OF THE INVENTION

Hereinafter, embodiments of the present invention are explained in conjunction with drawings.

First Embodiment

Figure 1:
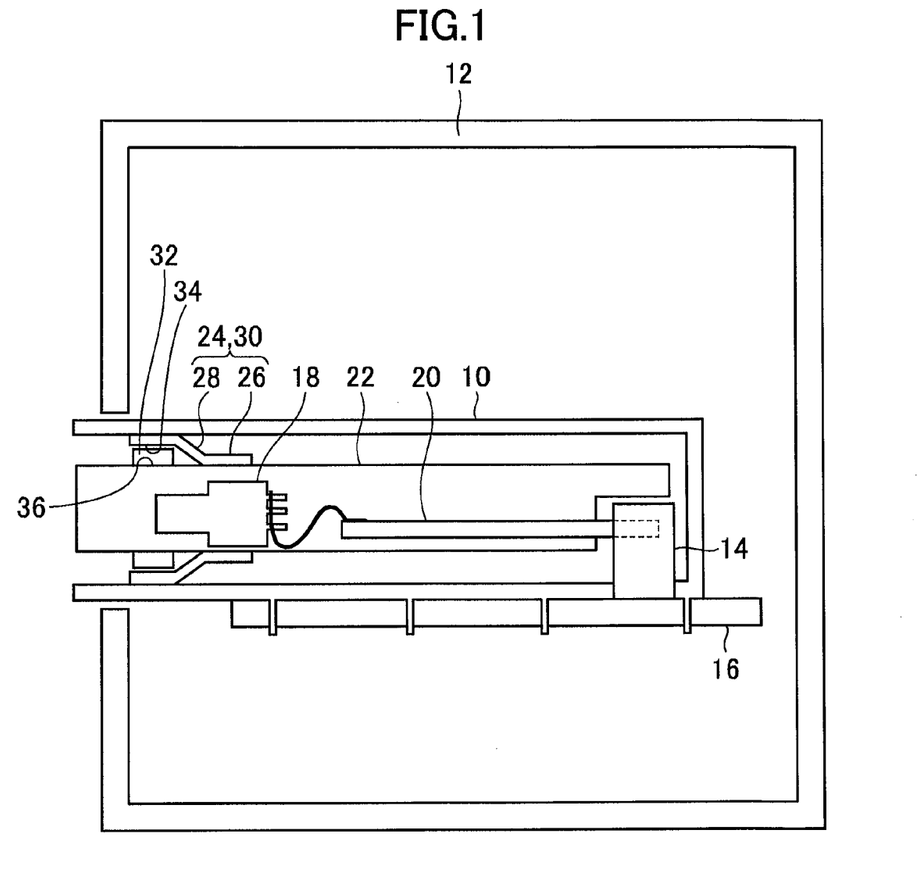
FIG. 1 is a schematic view showing a communication apparatus on which an optical module according to a first embodiment of the present invention is mounted.
Figure 2:
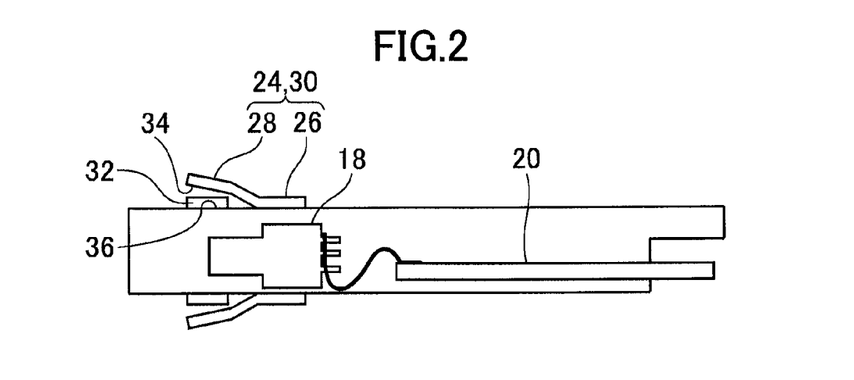
FIG. 2 is a schematic view of the optical module shown in FIG. 1 in a state where the optical module is removed from the communication apparatus.
Figure 3:
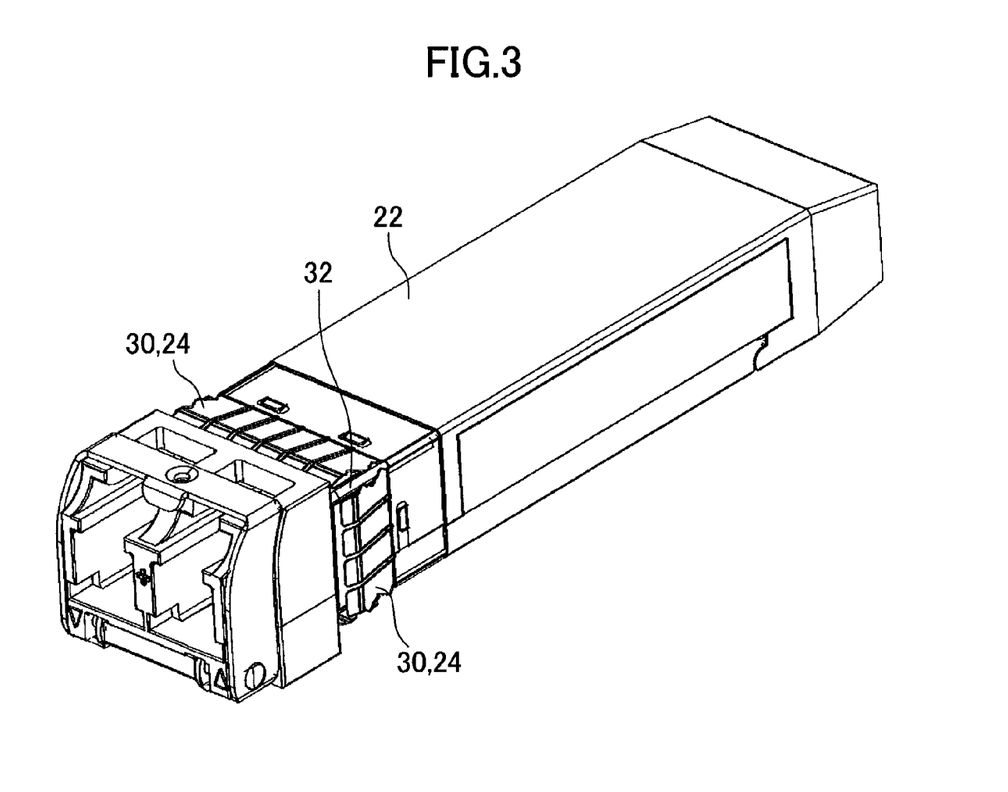
FIG. 3 is a perspective view showing a specific example of the optical module according to the first embodiment.

FIG. 1 is a schematic view showing a communication apparatus on which an optical module according to an embodiment of the present invention is mounted. FIG. 2 is a schematic view of the optical module shown in FIG. 1 in a state where the optical module is removed from the communication apparatus. FIG. 3 is a perspective view showing a specific example of the optical module according to the first embodiment.

The optical module shown in FIG. 3 is of an SFP+ (Small Form-Factor Pluggable Plus) type. However, the present invention is also applicable to an optical module of a CFP (C Form-Factor Pluggable) type. Further, the optical module to which the present invention is applicable is not limited to these optical modules provided that the optical module is inserted into a cage or is removed from the cage.

The optical module is brought into a pluggable state by being inserted into a cage 10 of the communication apparatus. The communication apparatus includes a plurality of (large number of) cages 10 in a housing 12. The cage 10 is hollow while having an opening. The cage 10 is made of a conductor such as metal, and is connected to a ground potential. Although not specifically limited, in this embodiment, one optical module is housed in one cage 10. With respect to the insertion direction of the optical module, an electric connector 14 is arranged at a deep portion of the cage 10. The electric connector 14 is fixed to a printed wiring board 16 and is also electrically connected with the printed wiring board 16. The cages 10 are formed in an array or in a matrix array, and may be of a type which houses a plurality of optical modules therein.

The optical module includes a photoelectric device 18. The photoelectric device 18 is configured to convert one of light energy and electric energy into the other. The photoelectric device 18 is housed in a photo receptacle connected to a photo connector not shown in the drawing from a left side in FIG. 1. To be more specific, the photoelectric device 18 is a TOSA (Transmitter Optical SubAssembly) or a ROSA (Receiver Optical SubAssembly). The optical module includes a printed wiring board 20, and the photoelectric device 18 is electrically connected to the printed wiring board 20. The printed wiring board 20 includes terminals not shown in the drawing, and is configured to establish the electrical connection by being inserted into the electric connector 14 of the communication apparatus.

The optical module includes a housing 22. The housing 22 houses the photoelectric device 18, the printed wiring board 20 and the like therein. The housing 22 is made of a conductor such as metal. Although parts which generate electromagnetic waves such as the photoelectric device 18 and the printed wiring board 20 are housed in the inside of the housing 22, most of the electromagnetic waves are shielded by the conductive housing 22. However, the electromagnetic waves are radiated to the outside through an opening portion of the housing 22 such as a connecting portion with the electric connector 14. Some of these electromagnetic waves propagate through a gap formed between the housing 22 and the cage 10, and propagate toward an opening portion of the cage 10 spatially. Further, some of these electromagnetic waves generate an induced current on a surface of the housing 22 due to an electromagnetic induction effect, and electromagnetic waves are generated outside the housing 22 due to this induced current, and the electromagnetic waves propagate toward the opening portion of the cage 10 from the outside of the housing 22.

An electric connection member 24 is mounted on the housing 22. To be more specific, the electric connection member 24 is mounted on an outer side of the housing 22 in a projecting manner. The electric connection member 24 has a mounting portion 26 by which the electric connection member 24 is mounted on the housing 22. In the case where the electric connection member 24 is integrally formed with the housing 22, the mounting portion 26 constitutes a proximal portion which projects from the housing 22. The electric connection member 24 is mounted on the housing 22 such that the electric connection member 24 is arranged in the vicinity of the opening portion of the cage 10 when the transmission module is inserted into the cage 10. The electric connection member 24 is made of a conductor, and is electrically connected to the housing 22. The electric connection member 24 is made of a material having elasticity (spring property). The electric connection member 24 has a floating portion 28. In this embodiment, the floating portion 28 is arranged at a position (a left side in FIG. 1) away from the mounting portion 26 by which the electric connection member 24 is mounted on the housing 22 in the direction opposite to the direction (the rightward direction in FIG. 1) that the optical module is inserted into the cage 10. The floating portion 28 is floated from the housing 22 with a gap therebetween. Provided that the optical module is configured such that the insertion and the removal of the optical module into or from the cage 10 are not obstructed, the floating portion 28 may be arranged at a position (a right side in FIG. 1) away from the mounting portion 26 in the direction that the optical module is inserted into the cage 10. Further, in general, the electric connection member 24 may be also referred to as a metal collar, an (EMI) finger or the like.

When the housing 22 is inserted into the cage 10, at least a portion of the floating portion 28 is brought into contact with an inner side of the cage 10 so as to establish the electrical connection therebetween. Particularly, the floating portion 28 is brought into pressure contact with the cage 10 due to elasticity (spring property) thereof.

As shown in FIG. 3, the electric connection member 24 is constituted of a plurality of finger-shaped lugs 30 which are arranged to each other with a gap therebetween. By separating the electric connection member 24 into the plurality of finger-shaped lugs 30, it is possible to bring the electric connection member 24 into contact with the cage 10 sufficiently. The finger-shaped lug 30 has a length necessary for ensuring elasticity. A gap between the neighboring finger-shaped lugs 30 is minute and hence, an amount of electromagnetic waves radiated from the housing which passes through the gap is an extremely trace amount whereby such electromagnetic waves can be ignored. The finger-shaped lug 30 has the mounting portion 26 by which the finger-shaped lug 30 is mounted on the housing 22 and the floating portion 28. The electric connection member 24 is provided over four sides of an outer surface of the housing 22 in the direction that the electric connection member 24 surrounds an axis which extends in the direction that the housing 22 is inserted into the cage 10.

The housing 22 and the cage 10 are electrically connected to each other by the electric connection member 24 and hence, an induced current which flows in the housing 22 flows in the electric connection member 24. Further, although the gap formed between the housing 22 and the cage 10 is closed by the electric connection member 24, it is difficult to completely close the gap by the electric connection member 24. Particularly, the gap is formed between the neighboring finger-shaped lugs 30. Although a leakage of electromagnetic waves from the gap is sufficiently reduced, electromagnetic waves are generated from the electric connection member 24 due to an induced current which flows in the electric connection member 24 from the housing 22 and an induced current which is generated in the electric connection member 24 due to electromagnetic waves generated outside the housing 22. That is, although electromagnetic waves are confined between the housing 22 and the cage 10 by the electric connection member 24, electromagnetic waves are radiated toward the outside from the electric connection member 24.

In view of the above, the optical module includes an electromagnetic wave absorption member 32. The electromagnetic wave absorption member 32 absorbs electromagnetic waves by converting the electromagnetic waves into energy other than the electromagnetic waves (for example, thermal energy). The electromagnetic wave absorption member 32 may be, for example, a material which is obtained by dispersing an electromagnetic wave loss material such as a dielectric material, e.g., a ferrite powder, or a magnetic material, e.g., carbon powder, into resin, rubber or fibers or by applying the electromagnetic wave loss material to resin, rubber or fibers by coating. The electromagnetic wave absorption member 32 has a sheet shape.

At least a portion of the electromagnetic wave absorption member 32 is positioned between the housing 22 and the floating portion 28. By arranging at least a portion of the electromagnetic absorption member 32 at such a position, the electromagnetic wave absorption member 32 can efficiently absorb electromagnetic waves.

The electromagnetic wave absorption member 32 is provided avoiding a state where the electromagnetic wave absorption member 32 faces in an opposed manner a portion of the floating portion 28 of the electric connection member 24 adjacent to the mounting portion 26 by which the electric connection member 24 is mounted on the housing 22. Due to such a constitution, the electromagnetic wave absorption member 32 does not obstruct the elastic deformation of the floating portion 28.

The electromagnetic wave absorption member 32 is adhered to a second opposedly facing surface 36 (a surface of the housing 22 which faces the floating portion 28 in an opposed manner), and is arranged in a spaced apart manner from a first opposedly facing surface 34 (a surface of the floating portion 28 which faces the housing 22 in an opposed manner). The electromagnetic wave absorption member 32 is provided avoiding mechanical parts for fixing the housing 22 to the cage 10 on the outer surface of the housing 22 in the direction that the electromagnetic wave absorption member 32 surrounds the axis. Although the electromagnetic wave absorption member 32 is adhered to the second opposedly facing surface 36 in this embodiment, the substantially same advantageous effects can be acquired even when the electromagnetic wave absorption member 32 is adhered to the first opposedly facing surface 34. If possible, the electromagnetic wave absorption member 32 may be provided to both the first opposedly facing surface 34 and the second opposedly facing surface 36. Although the electromagnetic wave absorption member 32 is provided avoiding the mechanical parts for fixing the housing 22 to the cage 10 in this embodiment, the electromagnetic, wave absorption member 32 may be provided over the whole circumference of the outer surface of the housing 22 without any cuts.

According to this embodiment, although the space between the housing 22 and the cage 10 is closed by the electric connection member 24, the re-radiation of electromagnetic waves is unavoidable. Accordingly, by providing the electromagnetic wave absorption member 32 in the vicinity of a portion to which the electromagnetic waves are re-radiated, the electromagnetic wave absorption member 32 can effectively absorb the re-radiated electromagnetic waves.

By adopting the structure of this embodiment, an amount of radiation of EMI toward the outside from the opening portion of the cage is reduced to approximately ⅛ of an amount of radiation of EMI before the structure of this embodiment is adopted.

The floating portion 28 of the optical module shown in FIG. 2, in a state where the optical module is removed from the cage 10, extends obliquely from the mounting portion 26 so as to expand in the outward direction. To be more specific, the floating portion 28 has one or a plurality of flat surfaces. Further, a distal end (an end portion on a side opposite to the mounting portion 26) of the floating portion 28 may be arranged at a position remotest from the housing 22 or may be arranged close to a housing 22 side in an arcuate shape.

Figure 4:
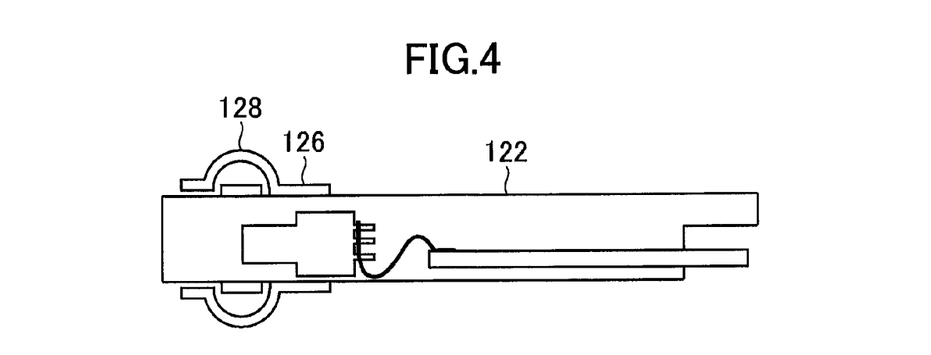
FIG. 4 is a schematic view showing an optical module according to a modification of the first embodiment.

FIG. 4 is a schematic view showing a modification of the electric connection member of the optical module shown in FIG. 2. A floating portion 128 of the optical module shown in FIG. 4 extends while drawing a convex surface from a mounting portion 126. To be more specific, the floating portion 128 extends while being away from a housing 122 by drawing a curved surface from the mounting portion 126 and, again, extends so as to approach the housing 122 by drawing a curved surface. Accordingly, an intermediate portion of the floating portion 128 becomes remotest from the housing 122.

Second Embodiment

Figure 5:
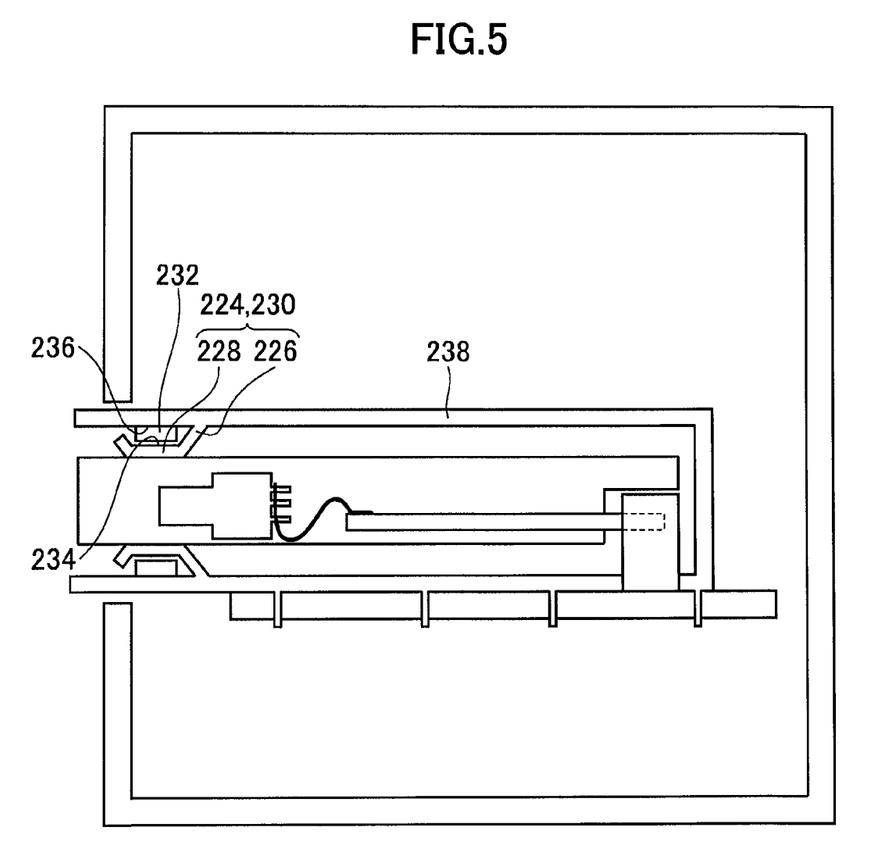
FIG. 5 is a schematic view of a communication apparatus provided with a communication-apparatus-use cage according to a second embodiment of the present invention in a state where an optical module is mounted on the communication apparatus.

FIG. 5 is a schematic view of a communication apparatus provided with a communication-apparatus-use cage according to a second embodiment of the present invention in a state where an optical module is mounted on the communication apparatus. The communication-apparatus-use cage is provided for bringing the optical module into a pluggable state with the communication apparatus when the optical module is inserted into the communication-apparatus-use cage.

The detail of the communication apparatus according to this embodiment is exactly equal to the detail of the communication apparatus explained in conjunction with the first embodiment except for the structure of the cage. Further, the detail of the optical module according to this embodiment is exactly equal to the detail of the optical module explained in conjunction with the first embodiment except for a point that the optical module does not have an electric connection member and an electromagnetic wave absorption member.

In this embodiment, the electric connection member and the electromagnetic wave absorption member which have been explained in conjunction with the first embodiment are mounted on the communication-apparatus-use cage. By taking such difference into consideration, the content explained in conjunction with the first embodiment is applicable to an electric connection member 224 and an electromagnetic wave absorption member 232.

A body 238 of the communication-apparatus-use cage is hollow while having an opening. The communication-apparatus-use cage has the electric connection member 224. The electric connection member 224 is mounted in a projecting manner on an inner side of the body 238 at a position in the vicinity of an opening portion. The electric connection member 224 has a mounting portion 226 by which the electric connection member 224 is mounted on the body 238. In the case where the electric connection member 224 is integrally formed with the body 238, the mounting portion 226 constitutes a proximal portion which projects from the body 238. The electric connection member 224 is electrically connected to the body 238. The electric connection member 224 has a floating portion 228 in a floating state spaced apart from the body 238. In this embodiment, the floating portion 228 is positioned away from the mounting portion 226 by which the electric connection member 224 is mounted on the body 238 in the direction opposite to the direction that the optical module is inserted into the body. Provided that the optical module is configured such that the insertion and the removal of the optical module into or from the cage are not obstructed, the floating portion 228 may be arranged away from the mounting portion 226 at a position (a right side in FIG. 5) in the direction that the optical module is inserted into the body.

The electric connection member 224 is constituted of a plurality of finger-shaped lugs 230 which are arranged adjacent to each other with a gap therebetween. The finger-shaped lug 230 has the mounting portion 226 by which the finger-shaped lug 230 is mounted on the body 238 and the floating portion 228. The electric connection member 224 is provided over the whole circumference of an inner surface of the body 238 in the direction that the electric connection member 224 surrounds an axis which extends in the insertion direction of the body 238 into the optical module. The electric connection member 224 may be provided avoiding mechanical parts for fixing the optical module to the body 238.

The communication-apparatus-use cage includes the electromagnetic wave absorption member 232. The electromagnetic wave absorption member 232 absorbs electromagnetic waves by converting the electromagnetic waves into energy other than the electromagnetic waves (for example, thermal energy). The electromagnetic wave absorption member 232 has a sheet shape. At least a portion of the electromagnetic wave absorption member 232 is positioned between the body 238 and the floating portion 228. The electromagnetic wave absorption member 232 is provided avoiding a state where the electromagnetic wave absorption member 232 faces in an opposed manner a portion of the floating portion 228 adjacent to the mounting portion 226 by which the finger-shaped lugs 230 are mounted on the body 238.

The electromagnetic wave absorption member 232 is adhered to a second opposedly facing surface 236 (a surface of the body 238 which faces the floating portion 228 in an opposed manner), and is arranged in a spaced apart manner from a first opposedly facing surface 234 (a surface of the floating portion 228 of the electric connection member 224 which faces the body 238 in an opposed manner). Although the electromagnetic wave absorption member 232 is adhered to the second opposedly facing surface 236 in this embodiment, the substantially same advantageous effects can be acquired even when the electromagnetic wave absorption member 232 is adhered to the first opposedly facing surface 234. If possible, the electromagnetic wave absorption member 232 may be provided to both the first opposedly facing surface 234 and the second oppesedly facing surface 236. The electromagnetic wave absorption member 232 is provided over the whole circumference of the inner surface of the body 238 in the direction that the electromagnetic wave absorption member 232 surrounds the axis without any cuts. The electromagnetic wave absorption member 232 may be provided avoiding the mechanical parts for fixing the optical module to the body 238.

When the optical module is inserted into the body 238, at least a portion of the floating portion 228 is brought into contact with an outer side of the optical module so as to establish the electrical connection therebetween.

According to this embodiment, although a space between the optical module and the body 238 is closed by the electric connection member 224, the re-radiation of electromagnetic waves is unavoidable. Accordingly, by providing the electromagnetic wave absorption member 232 in the vicinity of a portion to which the electromagnetic waves are re-radiated, the electromagnetic wave absorption member 232 can absorb the re-radiated electromagnetic waves. At least a portion of the electromagnetic wave absorption member 232 is arranged between the body 238 and the floating portion 228 and hence, the electromagnetic waves can be efficiently absorbed. The detailed manner of operation and advantageous effects are exactly equal to the corresponding manner of operation and advantageous effects explained in conjunction with the first embodiment and hence, the explanation of such manner of operation and advantageous effects is omitted.

Figure 6:
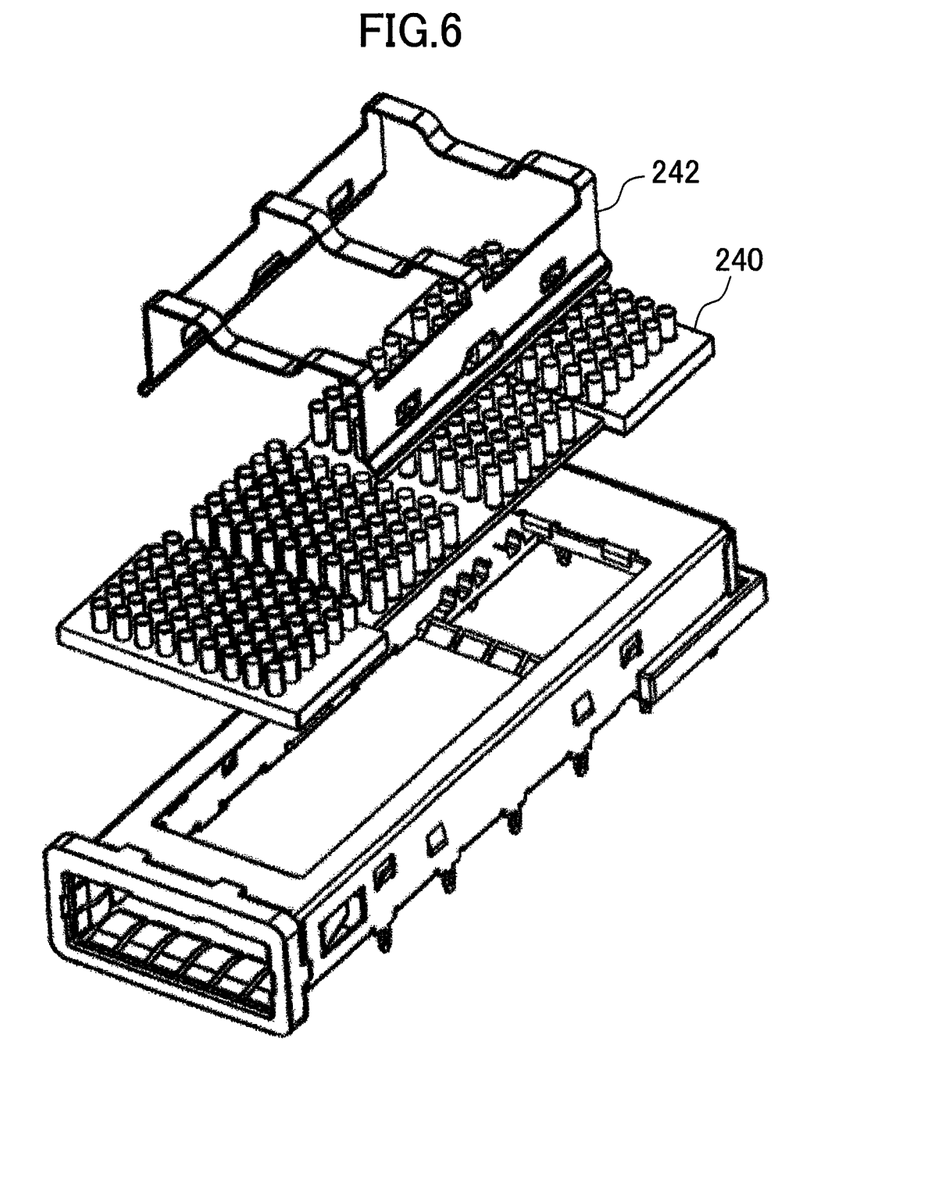
FIG. 6 is a perspective view showing a specific example of the communication-apparatus-use cage according to the second embodiment.

FIG. 6 is a perspective view showing a specific example of the communication-apparatus-use cage according to the second embodiment. The communication-apparatus-use cage shown in FIG. 6 corresponds to an optical module of an XFP (10 Gigabit Small Form Factor Pluggable) type. A heat sink 240 is mounted on the communication-apparatus-use cage, and the removal of the heat sink 240 is prevented by a stopper 242. When the optical module is mounted on the communication-apparatus-use cage, the heat sink 240 is brought into contact with the optical module. In the specification, the optical module may be any one of a transmitter which is furnished with transmitting function only, a receiver which is furnished with receiving function only, and transceiver which is furnished with transmitting and receiving function.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical module pluggable by insertion into a cage of a communication apparatus, the optical module comprising:
    a photoelectric device which converts one of light energy and electric energy into the other;
    a housing which houses the photoelectric device therein;
    an electric connection member which is provided to an outer side of the housing in a projecting manner for electrical connection with the housing; and
    an electromagnetic wave absorption member, wherein
    the electric connection member includes a mounting portion which is electrically connected to the housing, and a floating portion in a floating state spaced apart from the housing,
    at least a portion of the electromagnetic wave absorption member is arranged between the housing and the floating portion, and
    the floating portion is brought into contact with an inner side of the cage when the housing is inserted into the cage such that at least a portion of the floating portion is electrically connected to the inner side of the cage.

2. The optical module according to claim 1, wherein the electric connection member is constituted of a plurality of finger-shaped lugs which are arranged adjacent to each other with a gap therebetween, each finger-shaped lug includes the mounting portion by which the finger-shaped lug is mounted on the housing and the floating portion, and the electric connection member is mounted on the housing such that the electric connection member is arranged in the vicinity of an opening portion of the cage when the optical module is inserted into the cage.

3. The optical module according to claim 1, wherein the electromagnetic wave absorption member is provided avoiding a state where the electromagnetic wave absorption member faces in an opposed manner a portion of the floating portion of the electric connection member adjacent to the mounting portion by which the electric connection member is mounted on the housing.

4. The optical module according to claim 1, wherein the electromagnetic wave absorption member has a sheet shape, and is adhered to a first oppesedly facing surface of the floating portion of the electric connection member which faces the housing in an opposed manner and/or a second oppesedly facing surface of the housing which faces the floating portion in an opposed manner.

5. The optical module according to claim 1, wherein the electric connection member is provided over all sides of an outer surface of the housing in the direction that the electric connection member surrounds an axis which extends in the direction that the housing is inserted into the cage.

6. The optical module according to claim 5, wherein the electromagnetic wave absorption member is provided over all sides of the outer surface of the housing without any cuts in the direction that the electromagnetic wave absorption member surrounds the axis.

7. A communication-apparatus-use cage into which an optical module is inserted for plug connection, the communication-apparatus-use cage comprising:
    a hollow body having an opening;
    an electric connection member which is provided to an inner side of the body in a projecting manner; and
    an electromagnetic wave absorption member, wherein
    the electric connection member includes a mounting portion which is electrically connected to the body, and a floating portion in a floating state spaced apart from the body,
    at least a portion of the electromagnetic wave absorption member is arranged between the body and the floating portion, and
    the floating portion is brought into contact with an outer side of the optical module when the optical module is inserted into the body such that at least a portion of the floating portion is electrically connected to the outer side of the optical module.

8. The communication-apparatus-use cage according to claim 7, wherein the electric connection member is constituted of a plurality of finger-shaped lugs which are arranged adjacent to each other with a gap therebetween, each finger-shaped lug includes the mounting portion by which the finger-shaped lug is mounted on the body and the floating portion, and the electric connection member is arranged in the vicinity of an opening portion of the body.

9. The communication-apparatus-use cage according to claim 7, wherein the electromagnetic wave absorption member is provided avoiding a state where the electromagnetic wave absorption member faces in an opposed manner a portion of the floating portion of the electric connection member adjacent to the mounting portion by which the electric connection member is mounted on the body.

10. The communication-apparatus-use cage according to claim 7, wherein the electromagnetic wave absorption member has a sheet shape, and is adhered to a first opposedly facing surface of the floating portion of the electric connection member which faces the body in an opposed manner and/or a second opposedly facing surface of the body which faces the floating portion in an opposed manner.

11. The communication-apparatus-use cage according to claim 7, wherein the electric connection member is provided over all sides of an inner surface of the body in the direction that the electric connection member surrounds an axis which extends in the insertion direction of the optical module into the body.

12. The communication-apparatus-use cage according to claim 11, wherein the electromagnetic wave absorption member is provided over all sides of the inner surface of the body without any cuts in the direction that the electromagnetic wave absorption member surrounds the axis.

* * * * *